Patented May 29, 1951

2,554,485

UNITED STATES PATENT OFFICE 2,554,485

PROCESS FOR PREPARING MATERIAL USED FOR MOLDING MICROPOROUS OBJECTS

Galen J. Wilson, Dayton, Ohio, assignor to The National Cash Register Company, Dayton, Ohio, a corporation of Maryland No Drawing. Application January 2, 1948, Serial No. 360

10 Claims. (Cl. 260—2.5)

1

This invention relates to a process for making a solid, filled base-stock molding material suitable for use in manufacturing substantially uniformly micro-porous objects, such as printing plates, by molding and a subsequent operation to remove the filler.

Although the invention will be disclosed with particular attention to rubber-like material, such as natural or artificial or synthetic rubber selected from the class consisting of rubbery diolefin derivatives and rubbery polysulfides, it will be apparent that the broader aspects of the invention cover the use of other molding materials having the property of being workable on a mill.

In the novel process, particles of filler are incorporated in the solid molding material in a milling operation, using a volatile solvent or swelling agent, which is inert to the filler but affects the molding material to assist in the uniform dispersion of the filler particles in the molding material in such a manner that they can be removed from a product, after it has been molded, to produce uniform porosity, the amount of solvent used being sufficient to soften the molding material but insufficient to cause the molding material to become liquid. The filled base-stock molding material made by this process has many advantages over the form of base-stock materials previously used in the production of micro-porous articles, as will be explained more fully hereinafter.

Prior to the invention, several methods of incorporating removable fillers in base-stock molding materials had been tried, but the materials produced thereby had various limitations which made them not entirely suitable for use in making porous articles on a production scale.

A base-stock molding material in the form of a mixture of comminuted rubber and particles of sodium nitrate, as disclosed in the United States patent to Robert G. Chollar, No. 2,353,877, was used, and it was found that, while it was capable of producing excellent micro-porous plates, it had drawbacks which made it unsuitable for production in large quantities to be used as required in the molding of articles on a production scale. One of these drawbacks was that this form of base-stock material, being a relatively loose mixture of particles, was bulky and required a large amount of storage space. Another of these drawbacks was that, unless the rubber was comminuted immediately before use, it would tend to coalesce and prevent the proper mixture of the filler therein. Even when the filler was

2 mixed with the rubber immediately after the comminution of the rubber and the mixture was allowed to stand, the rubber particles would tend to coalesce and prevent proper distribution of the mixture in the mold, thereby preventing uniform porosity from being obtained in the final products molded therefrom.

Another form of base-stock material which was used consisted of a cast sheet of filled coagulum of rubber as disclosed in the United States Patent No. 2,432,221 to Galen J. Wilson. This base-stock material was obtained by making a solution of rubber dissolved in a solvent, which solvent was inert as to the filler, then adding particles of filler to form a slurry. The slurry thus formed was cast into open molds, where the solvent evaporated, leaving a solid coherent residue consisting of a continuous network of rubber having granular filler dispersed evenly therethrough. This form of material overcame the drawbacks of the other forms because it was very compact and did not take up much room in storage, but did not have a tendency to coalesce or lose its uniformity of dispersion, and would mold into objects from which the filler could be removed to provide substantially uniform porosity therein. While this form of material overcame the above drawbacks, it had a drawback of its own; namely, it could only be cast in relatively thin sheets because if cast in thick sheets the filler material would settle and become unevenly distributed before the solvent evaporated sufficiently for the rubber to hold the particles of filler against settling.

Another form of filled base-stock material which was tried consisted of a web or sheet of material in which the filler was incorporated by a straight milling operation without the use of any solvent for the molding material. The raw-stock material produced in this manner had the disadvantage that the filler particles were not uniformly dispersed in the rubber and were so encased in the rubber or the molding material that they could not be leached therefrom properly to form a suitable porous object. This appears also to have been the experience of the patentee Hauser, who in his Patent No. 2,175,798 explains that salt or other crystalline water-soluble substances could not be satisfactorily incorporated in a rubber mass in a milling operation and be later removed therefrom to form a uniformly porous mass.

In an effort to mill filler substances into the solid material so that they could later be removed to form a porous mass, Hauser did not use or suggest the use of the novel method of this application but instead milled in a starch as a filler. This filler was not easily leached from the molded product until after it had been treated to make it more soluble.

The novel process enables particles of removable filler material to be incorporated into solid rubber-like molding material to produce compact sheets thicker than heretofore and from which the filler may be removed readily after molding to produce a uniformly porous product. The filled base-stock material produced by the novel process overcomes the drawbacks of the previous forms of such material because it is compact, can be handled readily, is not affected by aging, can be made in sheets of desired thickness, and will have therein a uniform dispersion of filler particles which can readily be removed from the finished products to produce uniform porosity therein.

Therefore it is an object of the invention to provide a process for making a filled-base-stock molding material by milling particles of removable filler material of a desired fineness therein in such a manner that they can be removed from objects molded from the base-stock material to form uniform pores therein.

A further object of the invention is to provide a process for incorporating removable micro-fine particles of filler material in a solid molding material, using a milling operation and using a solvent for the molding material to assist in incorporating the filler material in the molding material so that the filler material can later be removed therefrom.

Another object of the invention is to provide a novel method for producing a base or raw-stock molding material containing finely divided removable filler substance making up from 42% to 74% of the volume of an article molded from the base-stock material, using a roller mill, a solid molding material, and a solvent for the molding material which does not affect the filler material but which assists in incorporating the filler in such a manner that it can be substantially removed to provide uniform porosity in any object molded from the base-stock material.

Another object of the invention is to provide a novel method for producing a base-stock filled material containing a uniform dispersion of finely divided particles of removable filler therein, which process includes mixing the filler material with a volatile solvent for a molding material, which solvent will not affect the filler material but will assist in incorporating the filler in the molding material; milling the mixture and the molding material until the filler material is thoroughly and uniformly incorporated in the molding material; sheeting the filled material from the mill in sheets of the desired thickness; and allowing the sheets to dry until any solvent remaining therein has evaporated therefrom.

In addition to the objects set forth above, other objects will become apparent from the following description of the novel process.

In previous attempts to mill leachable micro-fine granular material into rubber, the milling operation has caused the filler particles to be coated with the rubber which adhered thereto and prevented the filler from being leached from the final product.

It is found, however, that when a relatively small amount of solvent for the rubber-like material was present during the milling of the filler into the rubber, granular leachable filler up to about 74% of the volume of the final products molded from the base-stock material could be incorporated into the vulcanizable rubber-like material in the milling operation without damaging the particles and without coating the filler particles to an extent which would prevent them from being removed satisfactorily from the molded products to produce substantially uniform porosity therein. The base-stock material having the filler particles uniformly distributed therein can be sheeted from the mill in a solid sheet of sufficient thickness that articles having the desired thickness can be made from a single thickness of raw-stock material.

In order to explain the invention more clearly, several examples of the process will be given. It is to be understood that these examples are merely illustrative and that the invention is not to be limited to the use of the particular materials set forth in detail therein.

*Example I*

Filled base-stock molding material has been made from vulcanizable oil-resistant butadiene-acrylonitrile copolymers by the novel process.

A typical compound of this type of rubber-like material utilizing "Perbunan 26," which is supplied by the Enjay Company, of New York, N. Y., and other well-known compounding ingredients to give the physical qualities desired in resilient porous objects, as, for example, printing plates, was made using the following ingredients in parts by weight: "Perbunan 26," 100 parts; zinc oxide, 5 parts; benzothiazyl disulfide, known as "Altax," 1.5 parts; phenyl-beta-naphthylamine, known as "Neozone D," 1 part; stearic acid, 1 part; easy processing channel carbon black, known as "Wyex," 40 parts; and sulfur, 1.5 parts.

453.6 grams of this compound was put in a twelve-inch cold roller mill with the rollers set with an opening of .02 inch and given a preliminary milling for about three minutes.

After this period, 2571.9 grams of sodium nitrate which has been comminuted to particles of a size that 90% will pass a 325 mesh sieve and heated to drive off moisture, and which has been mixed with about 925 cc. of toluene, was put in the roller mill and was milled into the compound to thoroughly incorporate the sodium nitrate in the compound, requiring about twenty-seven minutes.

After this operation was completed, the mill rollers were set to have an opening of .0005 of an inch, and the mixture of the sodium nitrate and rubber-like compound was homogenized in the mill for about twelve minutes, followed by a final mastication for about forty-four minutes with the rollers set at .15 of an inch. At the end of this time, the mixture was sheeted from the mill with the desired thickness, and any solvent remaining in the mixture was allowed to evaporate either by air drying or by forced drying at 160 degrees Fahrenheit.

The above proportions by weight of the rubber-like compounded material and sodium nitrate will produce a molded product in which the filler makes up about 72% of its volume. When compounded rubber-like material and fillers having different specific gravities are used and when other proportions in the volume of filler to compound are desired, then the relation between the weight of the rubber-like compounded material and the filler material to be used may be varied as required to produce the desired composition of the base-stock material.

The size of the particles of filler used in the above example give excellent fineness to the pores, but the invention is not limited to the use of particles of this size, as filler particles which will pass a screen of 100 wires to the linear inch can also be used to produce pores of a size that are practically imperceptible to the unaided eye.

The mill roll spacing and the milling times given above produce excellent incorporation of the filler material into the compounded rubber-like material, but it is obvious that variations in the spacing of the rollers and in the time of milling can be made by those skilled in the art of milling rubber-like materials without adversely affecting the incorporation of the filler material in the rubber-like material.

In the above example, sodium nitrate is used as the filler material because it does not appreciably react with the rubber-like material, is not appreciably affected by the solvent for the rubber-like material, is not affected by molding and vulcanizing heat and pressure, and is easily leached with water. It is not intended that the invention be limited to the use of this particular filler material, because it is merely exemplary of a large class of soluble materials which are commonly used for producing pores in rubber-like material and which have the necessary properties so that they may be prepared with the required fineness, are relatively incompressible, will not be affected appreciably by molding pressures or curing temperatures, and are not affected by solvents for the rubber-like material but may be leached by solvents which will not impair the rubber-like material.

Furthermore, neither the particular solvent nor the amount used in the above example is critical, because the process has been carried out using other solvents such as tetrahydrofurfuryl alcohol and iso octane, and satisfactory results have been obtained by the use of from 700 to 1000 cc. of the solvent. Also, while the mixing of the solvent with the filler before the milling operation is a very convenient way to supply the solvent to the rubber-like material during milling, it is not essential, because the solvent can also be applied directly as the filler particles are being incorporated into the rubber-like material in the mill.

The base or raw-stock molding material of vulcanizable rubber-like material and solid leachable filler thus produced is in compact, sheet-like form, can be readily stored and handled, and can be used over long periods of time to produce molded objects.

The material produced by the novel process can be molded and vulcanized under heat and pressure to produce printing plates, using conventional molding techniques for the molding material. When the soluble filler has been incorporated in the molding material by the novel process, substantially all of the particles of it can be leached from the molded articles to produce micro-fine pores therein.

*Example II*

Filled base-stock molding material has also been made from vulcanizable butyl rubber by using the novel process.

A typical compound of this type of rubber-like material utilizing "Butyl Rubber GRI-Y 15," a fast-curing form of "Butyl Rubber GR-I-15," which is a copolymer of isobutylene and isoprene and which is supplied by the Office of Rubber Reserve, Reconstruction Finance Corporation, and utilizing other well-known compounding ingredients to give it the desired physical qualities for use in making resilient porous objects, as, for example, printing plates, was made by the use of the following ingredients in parts by weight: "Butyl Rubber GR-I-Y-15," 100 parts, zinc oxide, 5 parts; stearic acid, 3 parts, benzothiazyl disulfide, known as "Altax," 2 parts, sulfur, 3 parts; tetramethyl thiuram disulfide, known as "Thiuram M," 1 part; and easy processing channel carbon black, known as "Wyex," 30 parts.

Particles of sodium nitrate similar to those used in Example I were milled into this compound in the presence of a solvent, toluene, using the process and the same relation between the leachable filler, the compound, and the solvent as used in Example I.

The filled base stock sheets produced by this process also can be molded and vulcanized under heat and pressure, using conventional molding techniques for the compound used, and substantially all of the soluble filler particles can be leached from the molded articles to produce micro-fine pores therein.

*Example III*

Filled base-stock molding material also has been made from vulcanizable natural rubber by using the novel process.

Natural rubber in the form of smoked sheet was compounded with other well-known compounding ingredients to give it the desired physical properties for use in making resilient porous objects, such as printing plates, using the following ingredients in parts by weight: Smoked sheet, 100 parts; zinc oxide, 5 parts; benzothiazyl disulfide, known as "Altax," 1 part; stearic acid, 1 part; phenyl-beta-naphthylamine, known as "Neozone D," 1 part; sulfur, 3 parts; and easy processing channel carbon black, known as "Wyex," 40 parts.

Particles of sodium nitrate similar to those used in Example I were milled into this compound in the presence of a solvent, toluene, using the process and the same relation between the compound, the soluble filler, and the solvent as used in Example I.

The filled base-stock sheets thus produced can be molded and vulcanized under heat and pressure, using conventional molding techniques for the compound used, and substantially all the soluble filler partices can be leached from the molded articles to produce micro-fine pores therein.

*Example IV*

Filled base-stock material has been made by the novel process using a vulcanizable artificial or synthetic rubber of the organic polysulfide type.

A typical compound of this type of rubber-like material was made, utilizing "Thiokol Type FA," which is supplied by the Thiokol Corporation, of Trenton, New Jersey, and utilizing other well-known compounding ingredients to give it the desired physical properties for use in making resilient porous objects, such as printing plates, using the following ingredients in parts by weight: "Thiokol Type FA," 100 parts; benzothiazyl disulfide, known as "Altax," 0.3 part; diphenylguanidine, known as "DPG," 0.1 part; zinc oxide, 10 parts; stearic acid, 0.5 part; and easy processing channel carbon black, known as "Wyex," 5 parts.

Particles of sodium nitrate similar to those used in Example I were milled into this compound in the presence of a solvent, toluene, using the process and the same relations between the compound, the soluble filler, and the solvent as used in Example I.

The filled base-stock material thus produced can be molded and vulcanized under heat and pressure, using conventional molding techniques for the compound used, and substantially all of the soluble filler particles can be leached from the molded articles to produce micro-fine pores therein.

Inasmuch as the invention is concerned with the process for producing base stock from which micro-porous objects may be made, it is not intended that it be limited to its use with the particular compounds and the particular rubber-like materials specified in the above examples, because those given are merely illustrative, and other equivalent rubber-like materials and combinations of compounding ingredients to be used therewith will be apparent to those skilled in the art.

The artificial or synthetic rubbers "Perbunan 26," "Thiokol Type FA," and "Butyl Rubber GR–I–15" and the compounding ingredients known as "Altax," "DPG," "Neozone D," "Thiuram M," and "Wyex" are all well-known in the art and are all fully described in the publication "Compounding Ingredients for Rubber" (Second Edition, 1947), compiled by the editors of "India Rubber World" and printed by The Conway Printing Company, Inc., New York, N. Y.

While the process and the examples described herein are capable of fulfilling the objects primarily stated, it is to be understood that it is not intended to confine the invention to the exact process and examples hereof given herein, because variations can be made in the process by persons skilled in the art to produce satisfactory base-stock material without departing from the invention.

What is claimed is:

1. The process of making a sheet of filled base-stock molding material from which the filler can be substantially removed after a molding operation to enable resilient micro-porous objects to be made, said process consisting of milling on a cold roller mill solid micro-fine particles of a leachable filler into solid vulcanizable rubber-like material, said rubber-like material being selected from the class consisting of rubbery polymers of diolefin containing materials and rubbery polysulfides, to uniformly disperse the particles therethrough and using during the milling operation, a volatile solvent for softening the rubber-like material but inert as to the filler, in such a quantity as to assist in incorporating the particles of filler in the rubber-like material while the rubber-like material remains in a softened solid state, the solvent enabling the particles to be incorporated in the rubber-like material in such a manner that they can readily be removed from objects molded from the base-stock; sheeting the filled base-stock from the mill in sheets having the desired thickness, and allowing the solvent to evaporate therefrom, said filler material being selected so as to be resistant to a vulcanization process but leachable from the vulcanized product.

2. The process of making a sheet of filled base-stock molding material containing a uniform dispersion of micro-fine leachable solid particles in a vulcanizable rubber-like material, said rubber-like material being selected from the class consisting of rubbery polymers of diolefin containing materials and rubbery polysulfides, said process including the step of mixing micro-fine solid particles of filler material with a volatile liquid which is a solvent for the rubber-like material but not for the filler material; and the step of milling the mixture of particles of filler and liquid solvent and the solid vulcanizable rubber-like material on a cold roller mill to thoroughly incorporate the filler particles throughout the rubber-like material, the use of the volatile solvent enabling substantially all the particles to be subsequently leached from objects molded therefrom, the proportion of filler particles to rubber-like material in the base-stock material being such that the filler particles constitute from 42% to 74% of the volume of an object molded from the base-stock material, and the amount of solvent used being sufficient to so soften the rubber-like material as to assist the incorporation of the filler particles in the rubber-like material but not enough to cause the rubber-like material to become liquid, and the filler material being such as to be resistant to vulcanizing processes but leachable from an article vulcanized from the base-stock material.

3. The process for making a coherent homogeneous filled base-stock molding composition suitable for molding into desired objects from which the filler can be leached to form a porous body, including the step of mixing micro-fine particles of leachable filler material with toluene; and the step of milling the mixture and a solid vulcanizable toluene-softenable rubber-like material on a cold roller mill until the particles of filler material are thoroughy dispersed therein, said rubber-like material being selected from the class consisting of rubbery polymers of diolefin containing materials and rubbery polysulfides, and the proportion of filler to rubber-like material being such that objects molded from the base material will have about 72% voids therein after the filler has been leached therefrom, and the amount of toluene used being sufficient to soften the rubber-like material to assist in the proper incorporation of the filler particles in the solid rubber-like material so that they may be readily leached from articles molded from the base stock, said filler material being selected so as to be unchanged by a vulcanizing operation.

4. The process of making a sheet of filled base-stock molding material containing a uniform dispersion of micro-fine leachable solid particles in a vulcanizable rubber-like molding material, said rubber-like material being selected from the class consisting of rubbery polymers of diolefin containing materials and rubbery polysulfides, said process including the step of mixing solid particles of leachable filler material with a volatile solvent which is a solvent for the rubber-like material but not for the filler material; the step of milling the mixture of particles of filler and solvent and the solid vulcanizable rubber-like material on a cold roller mill to thoroughy incorporate the filler particles throughout the rubber-like material in such a manner as to allow the filler particles to be leached from objects molded from the base-stock material, the proportion of filler particles to the rubber-like material in the base-stock material being such that the filler particles constitute from 42% to 74% of the volume of an object molded from the base-stock material, and the amount of solvent used being sufficient to soften the rubber-like material to assist the incorporation of the filler particles in the rubber-like material but not enough to cause the rubber-like material to become liquid; the step of sheeting the milled material from the mill in sheets of the desired thickness; and the step of allowing any remaining solvent to evaporate from the filled sheet, said filler material being selected so as to be unchanged by a vulcanizing operation.

5. The process of making a sheet of filled base-stock molding material containing a uniform dispersion of micro-fine leachable solid particles in a vulcanizable natural rubber, said process including the step of mixing solid particles of leachable filler material with a volatile liquid which is a solvent for the rubber but not for the filler material; and the step of milling the mixture of particles of filler and solvent and the solid vulcanizable rubber on a cold roller mill to thoroughly incorporate the filler particles throughout the rubber, the rubber being softened by the liquid in such a manner as to enable substantially all the particles to be incorporated therein so as to be leachable from objects molded therefrom, the proportion of filler particles to rubber in the base-stock material being such that the filler particles constitute from 42% to 74% of the volume of an object molded from the base-stock material, the particles being of such material as to remain unchanged during a vulcanizing operation and the amount of solvent used being sufficient to assist the incorporation of the filler particles in the rubber but not enough to cause the rubber to become liquid.

6. The process for making a coherent homogeneous filled base-stock molding composition suitable for molding into desired objects from which the filler can be leached to form a porous body, including the step of mixing micro-fine particles of sodium nitrate with toluene; and the step of milling the mixture and solid vulcanizable natural rubber on a cold roller mill, about five and two-thirds parts of sodium nitrate to one part of natural rubber, by weight, being used, and the amount of toluene used being sufficient to soften the natural rubber to assist in the incorporation of the filler particles in the solid natural rubber.

7. The process of making a sheet of filled base-stock molding material containing a uniform dispersion of micro-fine leachable solid particles in a vulcanizable butadiene-acrylonitrile rubbery material, said process including the step of mixing solid particles of leachable filler material with a volatile liquid which is a solvent for the butadiene-acrylonitrile rubbery material but not for the filler material; and the step of milling the mixture of particles of filler and solvent and the solid vulcanizable butadiene-acrylonitrile rubbery material on a cold roller mill to thoroughly incorporate the filler particles throughout the butadiene-acrylonitrile rubbery material, the butadiene-acrylonitrile rubbery material being softened by the liquid in such a manner as to enable substantially all the particles to be incorporated therein so as to be leachable from objects molded therefrom, the proportion of filler particles to butadiene-acrylonitrile rubbery material in the base-stock material being such that the filler particles constitute from 42% to 74% of the volume of an object molded from the base-stock material, the particles being of such material as to remain unchanged during a vulcanizing operation and the amount of solvent used being sufficient to assist the incorporation of the filler particles in the butadiene-acrylonitrile rubbery material but not enough to cause the butadiene-acrylonitrile rubbery material to become liquid.

8. The process of making a sheet of filled base-stock molding material containing a uniform dispersion of micro-fine leachable solid particles in a vulcanizable copolymer of isobutylene and isoprene, said process including the step of mixing solid particles of leachable filler material with a volatile liquid which is a solvent for the copolymer but not for the filler material; and the step of milling the mixture of particles of filler and solvent and the solid vulcanizable copolymer on a cold roller mill to thoroughly incorporate the filler partices throughout the copoymer, the copolymer being softened by the liquid in such a manner as to enable substantially all the particles to be incorporated therein so as to be leachable from objects molded therefrom, the proportion of filler particles to copolymer in the base-stock material being such that the filler particles constitute from 42% to 74% of the volume of an object molded from the base-stock material, the particles being of such material as to remain unchanged during a vulcanizing operation and the amount of solvent used being sufficient to assist the incorporation of the filler particles in the copolymer but not enough to cause the copolymer to become liquid.

9. The process for making a coherent homogeneous filled base-stock molding composition suitable for molding into desired objects from which the filler can be leached to form a porous body, including the step of mixing micro-fine particles of sodium nitrate with toluene; and the step of milling the mixture and solid vulcanizable butadiene-acrylonitrile rubbery material on a cold roller mill, about five and two-thirds parts of sodium nitrate to one part of butadiene-acrylonitrile rubbery material, by weight, being used, and the amount of toluene used being sufficient to soften the butadiene-acrylonitrile rubbery material to assist in the incorporation of the filler particles in the solid butadiene-acrylonitrile rubbery material.

10. The process for making a coherent homogeneous filled base-stock molding composition suitable for molding into desired objects from which the filler can be leached to form a porous body, including the step of mixing micro-fine particles of sodium nitrate with toluene; and the step of milling the mixture and solid vulcanizable copolymer of isobutylene and isoprene on a cold roller mill, about five and two-thirds parts of sodium nitrate to one part of the copolymer, by weight, being used, and the amount of toluene used being sufficient to soften the copolymer to assist in the incorporation of the filler particles in the solid copolymer.

GALEN J. WILSON.

REFERENCES CITED

The following references are of record in the file of this patent:

UNITED STATES PATENTS

| Number | Name | Date |
|---|---|---|
| 1,602,624 | North | Oct. 12, 1926 |
| 2,006,687 | Riddock | July 2, 1935 |
| 2,175,798 | Hauser | Oct. 10, 1939 |
| 2,432,221 | Wilson | Dec. 9, 1947 |

FOREIGN PATENTS

| Number | Country | Date |
|---|---|---|
| 576,658 | Great Britain | Apr. 15, 1946 |

OTHER REFERENCES

Pages 941 to 945, Industrial and Engineering Chemistry, Aug. 1939.